Jan. 21, 1947.  C. P. GRIFFITH ET AL  2,414,596
TEMPERATURE COMPENSATING METER
Filed Feb. 1, 1940  3 Sheets-Sheet 2
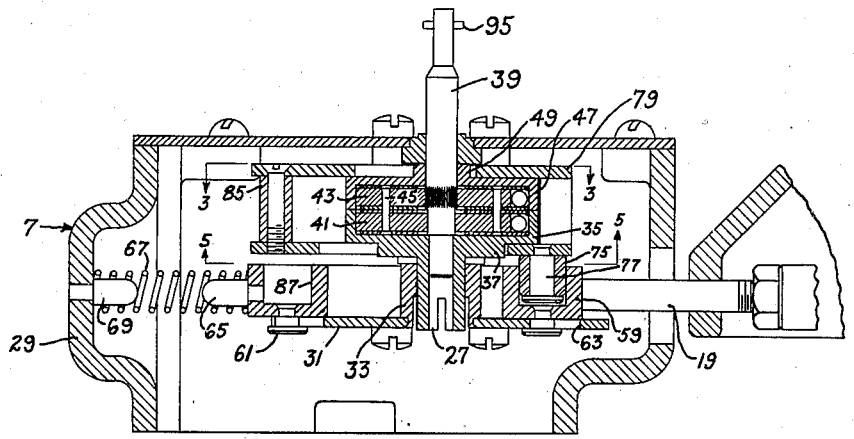
Fig. 2
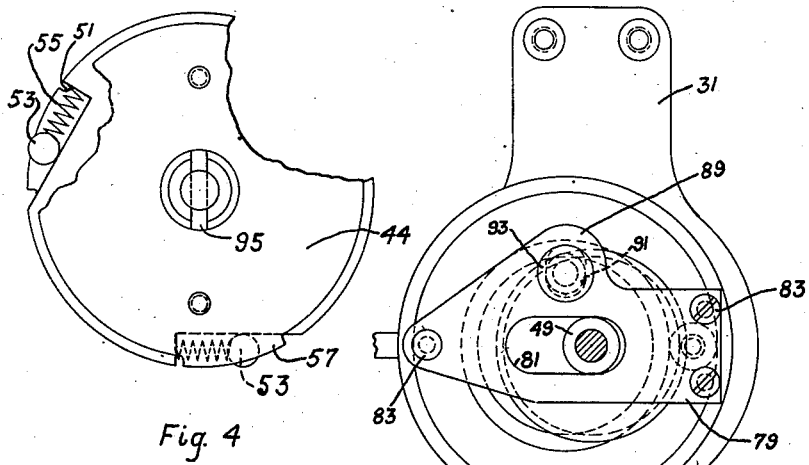
Fig. 4
Fig. 3
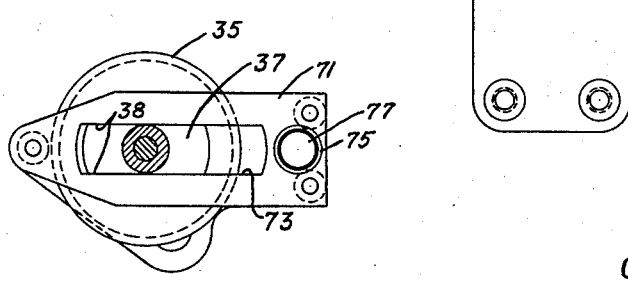
Fig. 5
Clement P. Griffith
Ralph B. Pressler
John J. Delaney.
INVENTORS
BY Edmund W. C. Kamm
ATTORNEY.

Jan. 21, 1947.　　C. P. GRIFFITH ET AL　　2,414,596
TEMPERATURE COMPENSATING METER
Filed Feb. 1, 1940　　3 Sheets-Sheet 3

Clement P. Griffith
Ralph B. Pressler
John J. Delaney
INVENTORS.

BY Edmund W. E. Kamm
ATTORNEY.

Patented Jan. 21, 1947

2,414,596

UNITED STATES PATENT OFFICE 2,414,596

TEMPERATURE COMPENSATING METER

Clement P. Griffith, Ralph B. Pressler, and John J. Delaney, Fort Wayne, Ind., assignors to S. F. Bowser & Company, Incorporated, Fort Wayne, Ind., a corporation of Indiana Application February 1, 1940, Serial No. 316,810

14 Claims. (Cl. 73—233)

This invention relates to a device for adjusting the quantity of liquid discharged by a liquid meter so that when the liquid is brought to a standard temperature, for instance, sixty degrees Fahrenheit (60° F.), it will occupy a standard volumetric space of, for instance, 231 cubic inches for a predetermined indication of, for instance, one gallon on the register.

It is an object of this invention to adjust the speed relation between the displacement mechanism and the registering mechanism of a meter in accordance with the temperature of the liquid being measured to correct for the expanded or contracted condition thereof with reference to a standard condition.

It is a further object of the invention to adjust the speed relation between the displacement mechanism and the registering mechanism of a meter in accordance with the coefficient of cubic expansion of the liquid being measured.

It is a further object of the invention to adjust the speed ratio between the displacement mechanism and the registering mechanism of a meter in accordance with the temperature of the liquid being measured.

Yet another object of the invention is to provide a mechanism which will vary the speed relation between the displacement and registering mechanisms of a meter in infinite ratio between predetermined limits.

In the drawings

Figure 2 is a sectional view of the infinite ratio speed change mechanism.

Figure 3 is a view taken on the line 3—3 of Figure 2.

Figure 4 is a top view of shaft 39 and the clutch assembly.

Figure 5 is a view taken on the line 5—5 of Figure 2 showing the clutch driving mechanism incorporated in the speed change mechanism.

Figure 1:
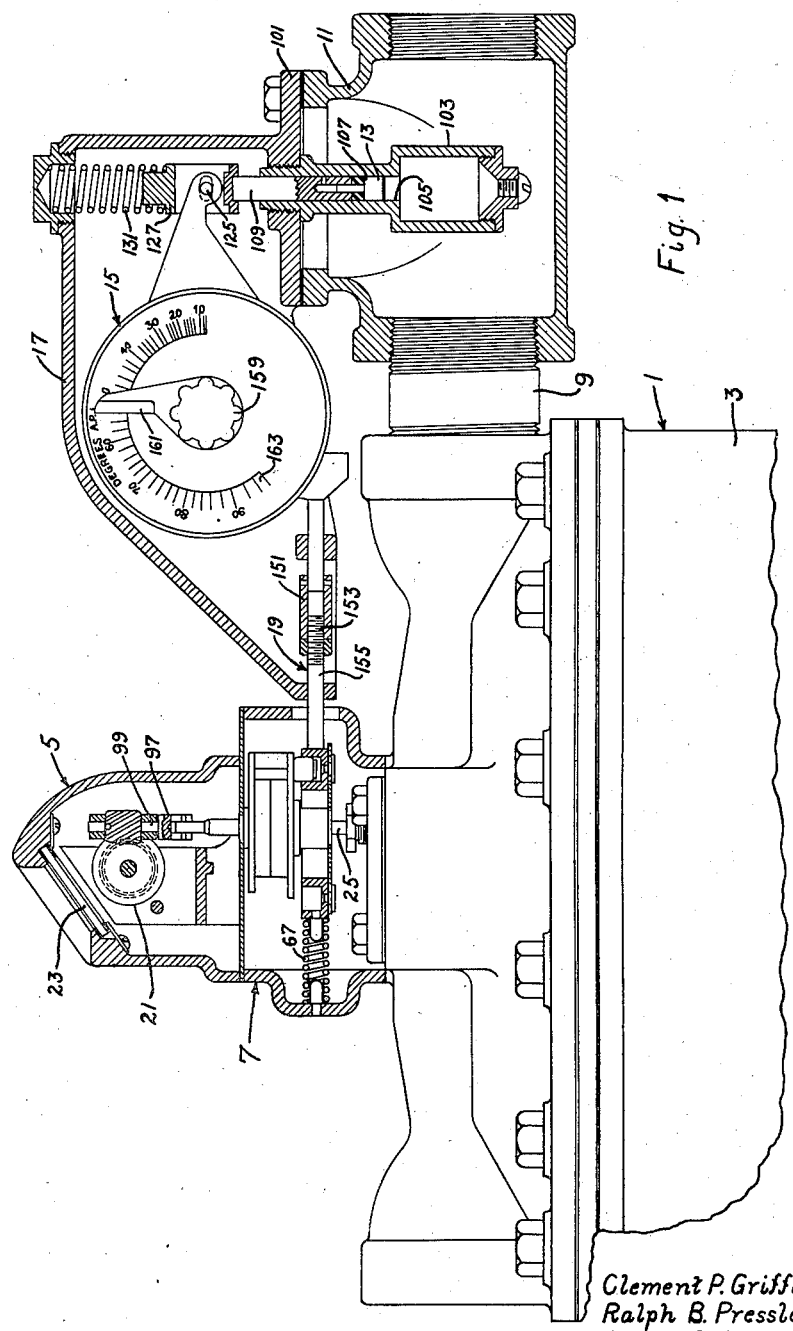
Figure 1 is an elevation of a meter and a thermostatic adjustment mechanism with parts in section to show the construction thereof.

In this specification the term "meters" is understood to comprise a displacement mechanism and a registering mechanism.

In practice, the amount of liquid discharged by a meter is evidenced by the reading of the register. In order to correct for the expanded or contracted condition of the liquid discharged, provision must be made for discharging more or less liquid for a predetermined advance of the register, so that when the discharged liquid is brought to a standard temperature it will occupy the volume of a standard unit quantity.

This adjustment may be made in one of two ways. First, the capacity of the displacement mechanism may be altered so that the quantity of liquid displaced by the displacement mechanism during a cycle of the meter may be varied; thus, when the indicator has been advanced a predetermined distance, as for instance one gallon, more or less than 231 cubic inches will have been discharged through the displacement mechanism if the temperature is more or less than sixty degrees Fahrenheit (60° F.). Under such conditions the speed relationship between the displacement mechanism and the register is a constant one as is clearly shown in the patent to Clement P. Griffith No. 2,151,201, issued March 21, 1939.

The displacement of the meter may be varied in another manner; that is, by varying the speed relation between the displacement mechanism and the register so that in a cycle of the meter, evidenced for instance by the advance of the register a distance of one gallon, a quantity of liquid which is more or less than that indicated by the register will have been displaced by the displacement mechanism depending upon whether the temperature of the liquid is above or below sixty degrees Fahrenheit (60° F.), because of the fact that the register is being driven at a speed different from that of the register driving shaft which is actuated by and moving in constant relation with the displacement mechanism.

In other words, if the meter and register are rotated at predetermined relative speeds then the adjustment of liquid dispensed during a cycle indicated by the register can be accomplished by varying the capacity of the displacement means. However, if the relative speeds of the register and displacement mechanisms can be varied, a similar adjustment of liquid dispensed during a cycle of the meter can be had.

This correction of the liquid discharge of the meter takes into account the factor of the coefficient of cubic expansion of the particular liquid being measured. Since it is contemplated that a single thermostat be used for all liquids the adjustment for coefficients is mechanical as will be seen from this specification.

It should be noted that the thermal expansion curves of the various liquids are not all parallel. In other words, the coefficient is not the same for any one liquid throughout the whole practical temperature range of that liquid nor is the same change of coefficients experienced in the same temperature ranges of different liquids. This is true of both the liquid in the thermostat and that being metered. It is especially true of "cracked" and "blended" gasolines. For this reason the results attained by meters utilizing the adjustments disclosed herein are not absolutely accurate. They are, however, within the usual prescribed commercial tolerances and provide a rapid means for commercially checking deliveries of liquids with the same accuracy, or probably better accuracy, than can be attained in making these corrections mathematically.

That the accuracy of the automatic meter is probably better than the mathematical determination results from the fact that the adjustment is made continuously instead of by intermittent samples, and the human factor in the making of a scientific determination with precision apparatus is eliminated.

Referring to Figure 1 of the drawings, numeral 1 indicates a meter which is comprised of the displacement mechanism 3 and the registering mechanism 5. The meter is preferably constructed in accordance with the patent to H. L. Blum No. 1,977,424, issued October 16, 1934. Between the displacement and the registering mechanisms a speed change mechanism indicated generally by the numeral 7 is interposed. Connected to the discharge port of element 3 by a close nipple 9 is a T 11 which houses a thermostat 13. An adjustable motion transmitting mechanism indicated generally by the numeral 15 is housed in a casing 17 and is connected by a linkage including a pushrod 19 to the speed change mechanism. The indicator wheels 21 in register 5 are visible through a glass 23 in the usual manner.

*Speed change mechanism*

The speed change mechanism is preferably of the "infinite ratio" type; that is, the ratios obtainable are not in fixed increments but are continuous within the predetermined limits of the device.

Referring now to Figures 2 to 5, the hollow shaft 27 is adapted to be driven by means of a pin and slot, or other connection, from the shaft 25 which is driven by the displacement mechanism. The housing 29 which is mounted on the displacement mechanism supports a bearing plate 31 into which is fixed a hub 33. The hub is perforated to receive and support the hollow shaft 27. The shaft 27 is formed at its upper end with a hollow cylindrical clutch housing or shell 35 and between the shell 35 and the lower end of the shaft 27 an elongated boss 37 having flatted paralled sides 38, shown more clearly in Figure 5, is formed.

A shaft 39 is provided with a reduced lower end which projects a short distance into the interior of shaft 27 from the top, as clearly shown in Figure 2. The shaft 39 is provided with a shoulder to limit the distance to which it enters shaft 27.

A clutch element 43 is fixed to the shaft 39 by being pressed onto a knurled portion of the shaft. Clutch elements 41 and 43 are provided on each side with spacers 44 and are held together in fixed relation with each other by pins 45. A second clutch shell 47 surrounds the clutch element 43. The clutch shell 47 is provided with a circular boss 49.

As clearly shown in Figure 4, the clutch elements 41 and 43 are provided with V-shaped notches 51 at their peripheries, and clutch balls 53 are positioned in the notches and urged toward engagement with the surrounding clutch shell by means of springs 55. The spacers 44 are provided with projections 57 which overlie the notches 51 so as to prevent any interference between the clutch balls 53 of the adjacent clutch. The notches 51 are so positioned that motion in a clockwise direction of the hollow shaft 27, when viewed from the bottom of Figure 2, will be transmitted to the shaft 39 and so that the additional movement of shaft 39 induced by the mechanism to be described will be in the same direction.

An annular track 59 is supported by means of pins 61 on the bearing plate 31. The pins are received in slots 63 which permit movement of said track along one of its diameters but which prevent any rotation or lateral movement of the track. The track is provided with a spring seat 65 and a compression spring 67 extends between seat 65 and a spring seat 69 mounted on the housing 29. The pushrod 19 is adapted to bear against the track at a point diametrically opposite to spring seat 65. The pushrod will adjust the track 59 in a direction longitudinally of the slots 63 and the spring 67 serves to cause the track to follow the pushrod 19 should the latter be withdrawn.

A plate 71 is provided with a slot 73 which is adapted to receive the elongated boss 37. A roller 75 is mounted on a pin 77 which is fixed in and depends from plate 71. A second plate 79, more clearly shown in Figure 3, is provided with a slot 81 adapted to receive the circular boss 49. Plates 79 and 71 are held together by screws 83 and spaced by means of the spacers 85.

The plates 71, 79 will have a rotary motion about the axis of shafts 27 and 39 because of the drive from shaft 27 through the boss 37 to the plate 71, and they will also have a reciprocating motion transversely of the shafts 27 and 39 which is caused by the roller 75 as it rides in the groove 87 in track 59. The amplitude of this reciprocating motion will vary with the degree of eccentricity of the track 59 with respect to the axis of the shafts 27 and 39.

The plate 79 is provided with a projecting ear 89 (Figure 3) which, in turn, is provided with an elongated slot 91 which is disposed in a direction transversely of the slot 81 in said plate. A pin 93 passes through said slot and is anchored in the upper clutch shell 47. It will thus be seen that as the plate 79 is reciprocated, as described above, a rotary motion will be imparted from the plate to the upper clutch shell 47 by means of the slot 91 and pin 93 just described.

Shaft 39 is provided at its upper end with a pin connection 95 which is adapted to drive a slot connection 97 of the register driving shaft 99. The register 5 may be of any desired construction which is adapted to indicate on the indicator wheels 21 the true amount of liquid dispensed by the displacement mechanism 3 at a standard temperature.

*Thermostatic adjustment mechanism*

Referring again to Figure 1, the T 11 is provided with a cap 101 which forms a part of the housing 17. A thermostatic bulb or chamber 103 is threadedly engaged in the cap 101 and is provided with a cylinder 105 in which is mounted a piston 107 which is provided with a rod 109. The piston 107 is suitably constructed to prevent leakage of liquid past it and the bulb 103 is filled with a suitable liquid such as "Stanisol" or any other suitable liquid.

The housing 17 is provided with a boss 111 in which is rotatably mounted a shaft 113. Pinned to the shaft is a lever 115 which carries a dial plate 117. Also, fastened to the dial plate by means of rivets 119 is a lever 121 which is provided with a pin 125 rigidly fixed in its outer end.

Pin 125 passes through elongated horizontal slots 123 in a yoke 127 which is mounted at its lower end on the top of the piston rod 109. The connection between the yoke and the rod may be a press fit or any other suitable means of connection. A spring seat 129 is formed on the upper portion of the yoke and a compression spring 131 is disposed between the spring seat and a spring seat 133 mounted in the housing 17.

A shaft 135 is mounted to pass through the center of the dial 117 and has a bearing in the lever 115. This shaft has fixed to it, between the dial and the lever, a gear 137. The gear is adapted to mesh with a rack 139 which is provided with an elongated slot 141 adapted to be received and to ride on the shaft 113.

The rack 139 is disposed with its axis extending at ninety degrees to the axis of the center line running from the pin 113 to the pin 125. The rack bears against a shoulder 157 on the lever 115 and is thus prevented from turning in respect to the shaft 113.

The rack carries at its lower end a headed pin 143 which is adapted to ride on a vertical face 145 of a follower 147 which is, in turn, fastened to one end of the pushrod 19.

The pushrod is formed of two parts which are guided in bearings in the casing 17. The one part 149, which carries the follower, is pinned in a coupling 151 which is internally threaded at 153 to receive the threaded end of the second portion 155 of the pushrod. A jam nut may be used to hold the portion 155 in adjusted relation in the coupling 151.

The shaft 135 is provided with a thumb knob 159 which has an indicator 161 attached thereto. This indicator, together with the graduations on the scale 163, will indicate the setting of the rack 139. A friction brake 165 is provided between the thumb knob and the dial 117 to hold the indicator in its adjusted position.

It should be noted at this point that the scale 163 would have to be calibrated differently when a different liquid is used in the thermostat. This is obvious from the fact that the adjustment of the speed change device must be in accordance with the properties of the liquid measured regardless of the expansion properties of the liquid in the thermostat.

*Operation*

If we assume that the standard temperature is sixty degrees Fahrenheit (60° F.) and the gallonage being dispensed is in United States gallons of 231 cubic inches each, then the displacement mechanism 3 of the meter must dispense 231 cubic inches of sixty degree Fahrenheit (60° F.) liquid when a delivery of one gallon is indicated on the indicator wheels 21 of the register 5.

In this position of the parts the setting of the indicator 161 with respect to the scale 163 preferably should not affect in any way the setting of the speed change mechanism, indicated generally by numeral 7, for the reason that under such conditions the rack 139, as it is moved by gear 137, should travel exactly parallel with the face 145 of the follower 147. At the same time the track 59 should be at a point preferably midway between its concentric and its extreme eccentric positions so that it will be capable of adding to or reducing the amount of travel imparted to shaft 39.

If we now assume that there is an increase in the temperature of the liquid being dispensed, the liquid contained in the bulb 103 will expand and will force the piston 107 and the piston rod 109 upwardly a predetermined amount. Such movement will be transmitted through the yoke 127, pin 125, arm 121, dial 117, lever 115 and rack 139 to the pin 143. The entire unit from the pin 125 to the pin 143 will rotate about the shaft 113 as a center in a counter-clockwise direction (Figures 1 and 6).

Figure 6:
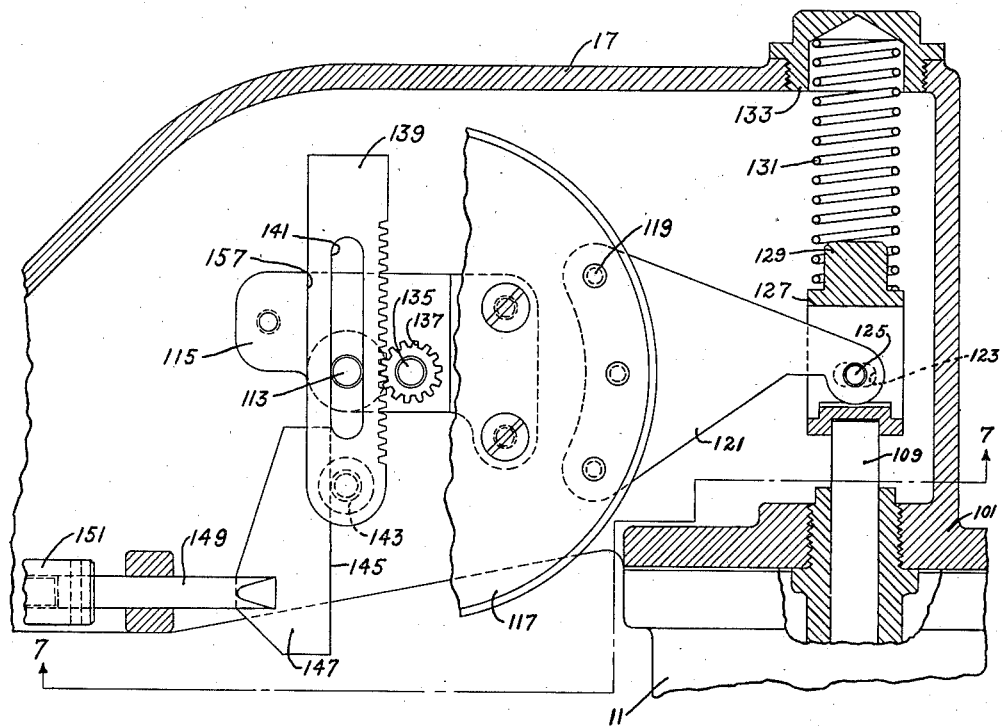
Figure 6 is an elevation with parts broken away showing the expansion adjustment mechanism.
Figure 7:
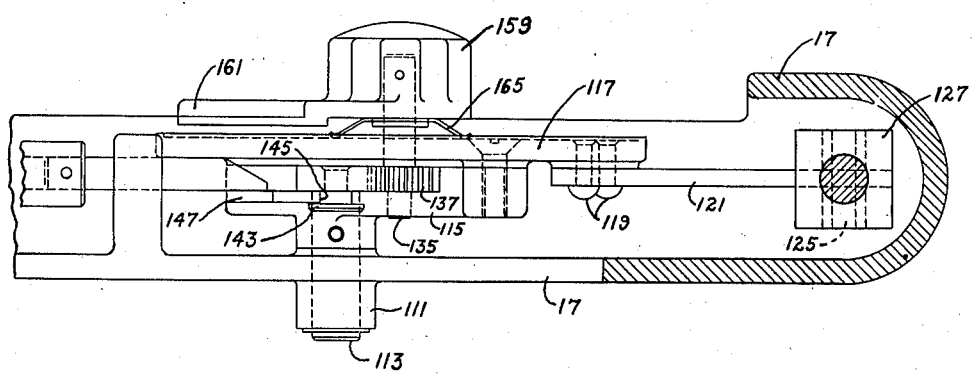
Figure 7 is a view taken on the line 7—7 of Figure 6.

This adjustment in the position of the pin 143 will permit the spring 67 in the speed change mechanism to shift the track 59, together with the pushrod 19, to the right, as viewed in Figures 1, 2 and 6. This results in a decrease in the speed ratio and more liquid will be dispensed by the displacement mechanism than at sixty degrees Fahrenheit (60° F.) to compensate for the expanded condition of the liquid. The amplitude of movement of the pin 143 under the action of the thermostat just described will vary in direct proportion to the perpendicular distance between the centers of the pin 143 and shaft 113. Accordingly, the setting of the indicator 161 with respect to the scale 163 controls the amplitude of movement which will be given to the pin 143 by any predetermined movement of the piston rod 109 of the thermostat, and thus the correction for the coefficient of cubic expansion of the liquid is made.

A decrease in the temperature of the liquid being measured will cause a reduction in the volume of the liquid in bulb 103 and the piston and piston rod will be forced downwardly by the spring 131. The lever 121, dial 117 and pin 143 will again be rotated about shaft 113 but in a clockwise direction (Figs. 1 and 6); that is, opposite to that described in connection with an increase of temperature. The movement of the pin 143 under a decrease in temperature will cause the follower 147 and pushrod 19 to move toward the left, as viewed in Figures 1, 2 and 6, and will serve to move the track 59 to the left against the opposition of spring 67 to increase the speed ratio, and less liquid will be dispensed than at sixty degrees Fahrenheit (60° F.) to compensate for the contracted condition of the liquid.

Thus it will be seen that the eccentricity of the track 59 with respect to the shafts 27 and 39 will be controlled in accordance with both the change in temperature of the liquid being measured and also the coefficient of expansion of the particular liquid being measured.

The coefficient of cubic expansion is commonly expressed in terms of degrees A. P. I. gravity and the scale shown in Figure 1 is graduated in terms of degrees A. P. I. inasmuch as this scale is commonly used in the petroleum industry. However, any suitable scale may be used instead of that shown.

Referring now to Figures 1 to 5, the shaft 127 is rotated in direct proportion to the speed of the displacement mechanism 3, as described above, and the clutch shell 35 is rotated at the same speed. Motion is transmitted to the clutch disk 41 through the balls 53 which are interposed between the shell 35 and the disk 41, and since the shaft 39 is fixed to the disk 41 it will be driven by said disk.

The upper clutch shell 47 is driven by means of the mechanism shown in Figure 3, that is to say, through the pin 93 which is driven by the reciprocation of the plate 79. Plates 79 and 71 comprise a unitary element or frame which is driven by the roll 75 riding in the groove 87 of track 59. The amplitude of reciprocating movement of this unit depends wholly upon the eccentricity of the track 59 with respect to the shaft 27.

The upper clutch shell 47, by reason of its connection with the plate 79, is rotated at the same speed as the shaft 27 when the groove 87 is concentric with the shafts 27 and 39, because the frame 71—79 will not be reciprocated by the track so as to alter the rotary motion which it transmits from shaft 27 to clutch shell 47. When the track groove 87 is eccentric to the shafts 27 and 39, the frame 71—79 will be reciprocated and will alternately push the clutch shell ahead in the direction of the rotation induced by shaft 27 and retract or pull the clutch shell back in the opposite direction. During the period when the shell is being pushed by the frame, it will be driven faster than the shaft 27 and clutch shell 35, and when it is being drawn back it will be driven at less speed than the shaft 27 and clutch shell 35. When the clutch shell 47 is being driven at a speed less than the speed of the clutch shell 35, the clutch balls 53 will not be in driving relation with the clutch element 43. During this period the clutch shell 35 will be driving the clutch element 41. However, when the clutch shell 47 is being driven at a greater speed than the clutch shell 35 the clutch balls 53 in this clutch will become active to drive the clutch element 43 while the clutch balls in element 41 will be slipping past clutch element 35 and the shaft 39 will be advanced at a speed greater than that of the shaft 27. During this operation the lower clutch 35, 41 becomes inoperative. The amount of overdrive thus attained is regulated by the amount of eccentricity of the track 59 with respect to the shaft 27.

It will thus be seen that as the temperature of the liquid increases the eccentricity of the track 59 will be decreased, as explained above, and the register 5 will be driven at a slower rate of speed than that imparted to it by the displacement mechanism 3 at the standard temperature.

In other words, the displacement mechanism will dispense more liquid in advancing the register a unit distance, for instance one gallon, than it would at the standard temperature. This increase in liquid compensates for the expanded condition of the liquid at the particular temperature of dispensing, and when the liquid dispensed has its temperature reduced to the standard temperature the volume occupied by the liquid under standard conditions will be substantially 231 cubic inches.

Should the temperature of the liquid being dispensed fall below the standard temperature, the movement of the track will be to the left, as described above, with the result that the register 5 will be driven at a greater rate of speed compared to its speed at the standard temperature.

Accordingly, the displacement mechanism 3 will not displace so much liquid as it would at the standard temperature to advance the register a unit distance, for instance one gallon; and accordingly, the liquid dispensed at this temperature would occupy a volume of less than 231 cubic inches. However, when the temperature of this liquid is brought up to the standard temperature under standard conditions the liquid will occupy substantially 231 cubic inches.

It is to be understood that the displacement mechanism 3 may be adjusted for purposes of calibration in the same way as that disclosed in the Patent 1,977,424 referred to above.

It is obvious that various changes may be made in the form, structure and arrangement of parts without departing from the spirit of the invention. Accordingly, applicants do not desire to be limited to the specific embodiment disclosed herein primarily for purposes of illustration; but instead, they desire protection falling fairly within the scope of the appended claims.

What we consider to be new and desire to protect by Letters Patent of the United States is:

1. In a liquid dispensing apparatus of the class described the combination of a displacement mechanism, a register, a speed change mechanism connected to be continually driven by said displacement mechanism and connected to continually drive said register, a thermostatic element disposed to be subjected to the temperature of the liquid being dispensed, and means connecting said thermostatic element with said speed change mechanism to adjust the same to increase the speed of the register relative to the displacement mechanism in accordance with a decrease in temperature of the liquid being dispensed, said connecting means including adjustable means for varying the adjustment of said speed change mechanism in accordance with the coefficient of cubic expansion of the liquid being measured.

2. In a liquid dispensing apparatus of the class described comprising in combination a displacement mechanism, a register, and a speed change mechanism connected to be continually driven by said displacement mechanism and connected to continually drive said register, thermostatic means for adjusting said speed change mechanism to compensate for the expanded or contracted condition due to the temperature of the liquid being measured and manually settable means for adjusting the speed of said mechanism in accordance with the coefficient of expansion of said liquid.

3. In a liquid dispensing apparatus of the class described a combination of a displacement mechanism, a register, and a variable ratio speed change mechanism connected between said displacement mechanism and said register, a thermostat subjected to the temperature of the liquid passing through said displacement mechanism and manually adjustable means connecting said thermostat to vary the ratio of said speed change mechanism, said adjustable means being constructed and arranged to modify the variation effected by said thermostat.

4. In a liquid dispensing apparatus of the class described comprising in combination a displacement mechanism, a register, adjustable, infinite ratio speed change mechanism connected to be continually driven by said displacement mechanism and connected to continually drive said register, thermostatic means for adjusting said speed change mechanism and additional manually settable means for adjusting said speed change mechanism to correct the speed of said register in accordance with the coefficient of cubic expansion of the liquid being measured.

5. In a liquid dispensing apparatus of the class described comprising a displacement mechanism, a register, and a speed change mechanism connecting the displacement mechanism and register, said speed change mechanism comprising an adjustable element adapted on movement to change the speed ratio between the displacement mechanism and said register, an adjustable ratio bell crank connected to move said adjustable element, manually settable means for adjusting the ratio of the crank and a thermostat arranged to be subjected to the temperature of the liquid being dispensed for actuating said bell crank.

6. In a liquid dispensing apparatus of the class described comprising a displacement mechanism, a register, and a speed change mechanism connecting the displacement mechanism and register, said speed change mechanism comprising an adjustable element adapted on movement to change the speed ratio between the displacement mechanism and said register, an adjustable ratio bell crank connected to move said adjustable element and a thermostat arranged to be subjected to the temperature of the liquid being dispensed for actuating said bell crank, and means including a scale and indicator for adjusting the ratio of the arms of the bell crank.

7. In a liquid dispensing apparatus of the class described comprising a displacement mechanism, a register, and a speed change mechanism connecting the displacement mechanism and register, said speed change mechanism comprising an adjustable element adapted on movement to change the speed ratio between the displacement mechanism and said register, a right-angled bell crank provided with an adjustable arm and means for indicating the ratio of relation of the arms of said bell crank, means connecting one of said arms for moving said adjustable member and a thermostat subjected to the temperature of the liquid being dispensed connected to operate the other of said arms.

8. In a liquid dispensing apparatus of the class described comprising in combination a displacement mechanism, a register, and an adjustable infinite ratio speed change mechanism connected to be driven by said displacement mechanism and connected to drive said register, thermostatic means responsive to the temperature of liquid being dispensed and means, adjustable for the coefficient of cubic expansion, connecting said speed change mechanism for adjustment by said thermostatic means.

9. In a liquid dispensing apparatus of the class described comprising a displacement mechanism, a register, and a speed change mechanism connecting the displacement mechanism and register, said speed change mechanism comprising an adjustable element adapted on movement to change the speed ratio between the displacement mechanism and said register, an adjustable ratio lever system connected to move said adjustable element and a thermostat arranged to be subjected to the temperature of the liquid being dispensed for actuating said lever system.

10. In a liquid dispensing apparatus of the class described comprising a displacement mechanism, a register, and a speed change mechanism comprising a pair of overrunning clutches connected to be driven by said displacement mechanism and connected to drive said register, adjustable means for imparting an intermittent acceleration to one of said clutches whereby said register will be driven at a greater speed than said displacement mechanism, thermostatic means for setting said adjustable means to compensate for the changes in temperature of the liquid being dispensed and an adjustable motion modifying mechanism interposed between said thermostatic means and said motion imparting means to compensate for the cubical expansion property of the liquid being measured.

11. In a liquid dispensing apparatus of the class described comprising a displacement mechanism, a register, and a speed change mechanism comprising a pair of overrunning clutches connected to be driven by said displacement mechanism, and connected to drive said register, adjustable means for imparting an intermittent acceleration to one of said clutches whereby said register will be driven at a greater speed than said displacement mechanism, thermostatic means movable in accordance with the changes in temperature of the liquid being dispensed and means for transmitting movement of said thermostatic means to said adjustable means, said transmitting means being adjustable to modify the movement transmitted to correct for the coefficient of cubic expansion of the liquid being dispensed.

12. In a liquid dispensing apparatus of the class described, a displacement mechanism, a register, speed controlling means for continually driving said register from said displacement mechanism and for varying the speed relation therebetween, a thermostat disposed to be subjected to the temperature of the liquid passing through the displacement mechanism, a setting mechanism including setting indicating means, and means for connecting said thermostat and said setting mechanism to actuate said speed controlling means to vary the speed relation between said displacement means and said register in accordance with the temperature and coefficient of cubic expansion of said liquid.

13. In a liquid dispensing apparatus of the class described comprising a displacement mechanism, a register, adjustable speed change means connecting said displacement mechanism to drive said register continually as said displacement mechanism operates, thermostatic means responsive to the temperature of the liquid, settable coefficient of expansion compensating means and connections between said thermostatic means and said speed change means and between said compensating means and said speed change means for adjusting said speed change means, whereby said register will indicate a value which has been adjusted for the effects of temperature and the expansion characteristic of the liquid being dispensed.

14. In a liquid dispensing apparatus of the class described, comprising in combination a displacement mechanism, a register, and a speed change mechanism connected to be continually driven by said displacement mechanism and connected to continually drive said register, thermostatic means for adjusting said speed change mechanism to compensate for the expanded or contracted condition of the liquid due to variations in temperature above or below a predetermined standard, and manually settable means for adjusting the speed of said mechanism in accordance with the coefficient of expansion of the liquid being measured.

CLEMENT P. GRIFFITH.
RALPH B. PRESSLER.
JOHN J. DELANEY.